United States Patent [19]

Uhrich

[11] Patent Number: 5,611,484
[45] Date of Patent: Mar. 18, 1997

[54] THERMOSTAT WITH SELECTABLE TEMPERATURE SENSOR INPUTS

[75] Inventor: Daniel T. Uhrich, Mayer, Minn.

[73] Assignee: Honeywell Inc., Minneapolis, Minn.

[21] Appl. No.: 168,345

[22] Filed: Dec. 17, 1993

[51] Int. Cl.⁶ .............................. F25B 41/00; F23N 5/20
[52] U.S. Cl. ........................ 236/46 R; 62/213; 236/78 B
[58] Field of Search ............................. 236/78 BF, 46 R, 236/51, 47, 91 E, 1 B; 62/213, 229; 374/110

[56] References Cited

U.S. PATENT DOCUMENTS

| 3,917,165 | 11/1975 | Cross | 236/47 |
| 4,264,034 | 4/1981 | Hyltin | 236/46 R |
| 4,977,752 | 12/1990 | Hanson | 62/213 X |
| 4,997,029 | 3/1991 | Otsuka et al. | 165/12 |
| 5,135,045 | 8/1992 | Moon | 236/51 X |
| 5,181,653 | 1/1993 | Foster et al. | 236/49.3 |
| 5,197,668 | 3/1993 | Ratz et al. | 236/51 |
| 5,299,430 | 4/1994 | Tsuchiyama | 62/213 X |

FOREIGN PATENT DOCUMENTS 0056558 4/1980 Japan ................................. 236/78 B Primary Examiner—William E. Wayner
Attorney, Agent, or Firm—Edward L. Schwarz

[57] ABSTRACT

A thermostat has terminals to receive at least two temperature sensor signals, and changes the one of these terminals which provides the feedback signal for temperature control responsive to a detected condition. This condition may be a manual input, expiry of a time interval, reaching a time of day, or the relative magnitudes of the temperatures encoded in the sensor signals.

11 Claims, 3 Drawing Sheets

THERMOSTAT WITH SELECTABLE TEMPERATURE SENSOR INPUTS

BACKGROUND OF THE INVENTION

In many space temperature control situations, it is desirable to maintain different temperatures in different areas of the structure. It is usual to deal with this situation with so-called zone control. In this arrangement, a single HVAC unit provides heated or cooled air or heated water to each of the areas. The flow of the air or water to each area is under the control of a damper or valve operated by a thermostat dedicated to control of the temperature in that area.

While this is an extremely effective way to address the problem of maintaining different temperatures in different areas, it has disadvantages. The need for additional dampers or valves and additional thermostats adds cost. Where the zone control is added to an existing installation, the problem of adding the dampers or valves in existing ducts or pipes may be extremely expensive.

Another problem arises in single zone installations where it is necessary to control the temperature in different areas because of changing uses of the areas. For example, starting a fireplace in one's living room may increase the heat sensed by the nearby thermostat, causing the rest of the structure to be held uncomfortably cool. The same is true if a thermostat is located too close to the kitchen, when the oven is in heavy use. Of course, in these situations, it is possible to manually adjust the thermostat setting to compensate for the effect on its sensor, but the control is imprecise for other areas, with the result that comfort in those areas may be affected.

Accordingly, there is a need for a new approach in temperature control where different temperatures must be maintained in different areas of an enclosure.

BRIEF DESCRIPTION OF THE INVENTION

I have developed an improvement to the traditional electronic thermostat which provides an improved level of control in the situations described above. The traditional thermostat has a power switch having a control terminal and a pair of power terminals. When a demand signal is applied to the control terminal of the power switch, the switch makes an electrical connection between the power terminals. A control circuit has a sensor input terminal and an output terminal providing the demand signal to the power switch's control terminal responsive to a selectable signal level at the sensor terminal.

This improvement comprises at least first and second temperature sensors each providing a sensor signal representative of the temperature ambient thereto. I contemplate that a sensor will be located in each of the areas where the occupants desire the temperature to be controlled. A sensor selection means receives each of the sensor signals, and includes a selectable control input, for providing a single one of said sensor signals designated by the control input to the control terminal of the control circuit. There are a number of preferred embodiments for the sensor selection means. In the simplest form, the sensor selection means comprises nothing more than a SPDT switch under manual control by the occupant. The occupant selects the active sensor by manipulating the SPDT switch. In more sophisticated embodiments, the sensor selection means may comprise a timer or clock to control the duration of the active interval for one of the sensors. In yet another embodiment, the actual level of the temperature sensed by one of the sensors, controls the selection of the active sensor.

Accordingly, one of the purposes of this invention is to allow an occupant of a space to select one of a plurality of temperature sensors to provide the temperature signal to the thermostat.

Another purpose is to change the active sensor when ambient heat sources may affect the accuracy of the control operation.

Yet another purpose is to provide some the functions of a zoned system without the expense and effort required by a full-fledged zone control system.

DESCRIPTION OF THE PREFERRED EMBODIMENTS

Figure 1:
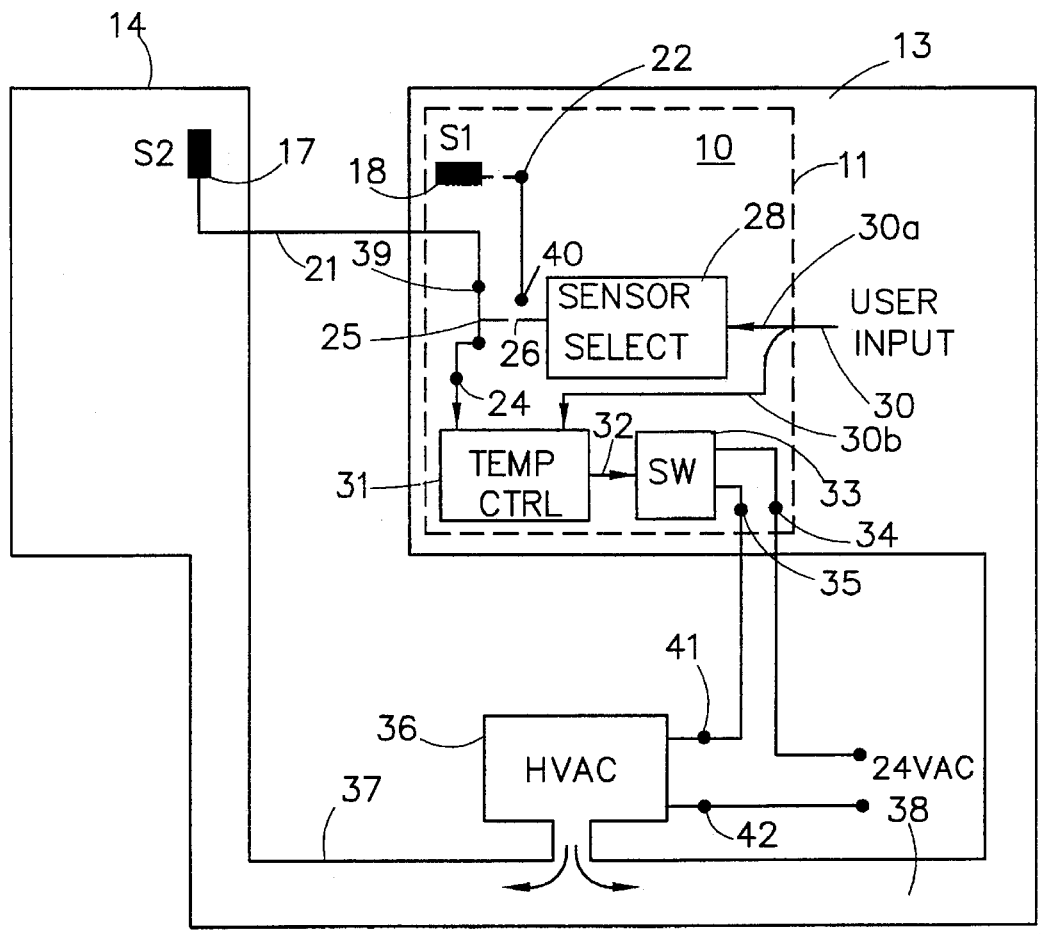
FIG. 1 shows an installed version of a generalized embodiment of the invention.

Turning first to the embodiment shown in FIG. 1, an electronic thermostat 10 constructed according to the invention is shown installed in an area 13 of an enclosure. The enclosure has a second area 14 also. The various elements of thermostat 10 are all mounted within a housing 11. Thermostat 10 is shown in block diagram form and includes a conventional temperature control circuit 31 providing a demand signal on a path 32 to a control terminal of a power switch 33 responsive to a set point temperature provided on path 30b and a sensor signal encoding a temperature provided to a sensor signal input terminal 24. Path 30b forms a part of a user input path 30 on which the occupant can provide the set point temperature. Power switch 33 may be a relay, SCR, or power transistor, and has power terminals 34 and 35. When the demand signal is present on path 32, switch 33 is in its closed state with conduction between its power terminals 34 and 35. Still conventionally, 24 VAC control power is applied to a HVAC unit 36 when switch 33 is closed. HVAC unit 36 provides heated (or air conditioned) air through ducts 37 and 38 to areas 14 and 13 when 24 VAC is applied to unit 36.

A first sensor 18 is located within area 13 and provides on path 22 a sensor signal encoding the temperature S1 ambient to sensor 18. It is convenient to locate sensor 18 within the housing 11 as a part of the thermostat 10 itself. A second sensor 17 is mounted in the second area 14 and provides a sensor signal encoding a temperature S2 on path 21 ambient to sensor 17. The signal from sensor 17 is applied to input terminal 39 of a signal switch 25 forming a part of a sensor selection means. The signal from sensor 18 is applied to input terminal 40 of a signal switch 25 forming a part of a sensor selection means. In the form shown in FIG. 1, signal switch 25 is a SPDT switch having first and second positions corresponding respectively to the sensor signals from sensors 17 and 18. A sensor selector 28 controls switch 25 through a connection 26. In the example here, where switch 25 is mechanically controlled, selector 28 may be nothing more than a simple knob or lever and the connection 26 may be a shaft or linkage for changing the position of switch 25. The occupant's input for selector 28 is shown as provided on path 30a, also forming a part of the user input path 30.

When switch 25 is in the position shown in FIG. 1 with input terminal 39 connected to control terminal 24, the signal from sensor 17 which encodes the temperature S2 of area 14 is applied to the sensor signal input terminal 24 of control circuit 31, with the result that the temperature S2 of area 14 is held by HVAC unit 36 to the set point temperature provided on path 30b. When switch 25 is moved to the alternate position with terminal 40 connected to control terminal 24, then the temperature S1 of area 13 indicated by the signal from sensor 18 is provided to control terminal 24 of circuit 31. The temperature S1 of area 13 is then held to the set point value supplied on path 30b.

Conventional electronic thermostats all use a small microcontroller to provide the various thermostat control and data storage functions, and I prefer to implement this invention too, within this microcontroller. In such an implementation, the microcontroller periodically executes instructions which during their execution causes the microcontroller to briefly become each of the switch 25 and elements 28 and 31. The set point temperature provided on path 30b and the feedback temperature provided to terminal 24 are converted to digital values and stored in the RAM (random access memory) of the microcontroller. The microcontroller's RAM allows communication among elements 25, 28, and 31 by storing or recording the digital patterns representing the temperatures and other values necessary to provide the thermostat's control functions. As individual instructions are processed, the arithmetic and logical elements of the microcontroller supply read request signals to the RAM as needed to retrieve these values in signals digitally encoding them.

Electronic thermostats are now available which use a second sensor located outdoors in order to more accurately control recovery from a setback temperature. Such a second sensor can be connected to its thermostat by a conductor pair up to 100 feet (30 meters) long. With the hardware already available to accommodate a second sensor, I presently consider it to be most convenient to simply reprogram such a thermostat to implement the invention.

When implementing the invention in a microcontroller, connection 26 comprises a conductor carrying a selection signal whose level or voltage pattern controls the position of switch 25. When switch 25 is implemented in software, the selection signal is carried on connection 26 and specifies the state or position of switch 25. The value of the selection signal can be tested by the instructions which cause the microcontroller to comprise control circuit 31, by which can be determined the sensor signal to be provided to the control terminal. The inputs to selector 28 are provided by the occupant through the keypad usually forming a part of electronic thermostats. The function of the switch 25 as implemented in the microcontroller takes the form of selecting which of the memory locations of the microcontroller RAM supply the feedback temperature value to the instructions which configure the microcontroller to function as the control circuit 31.

Figures 2, 3:
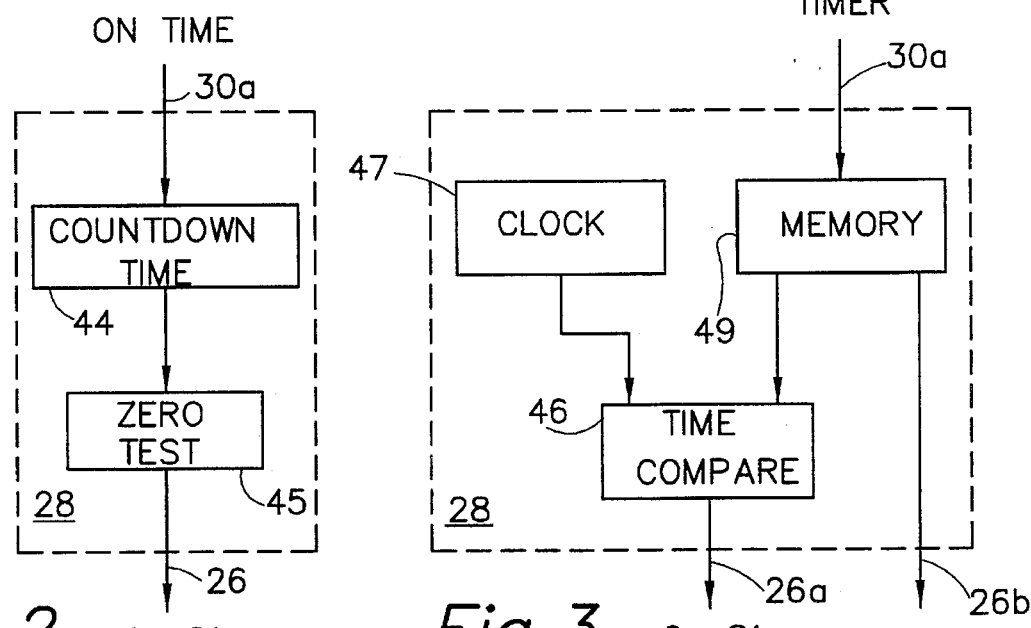
FIGS. 2–4 shows first, second, and third preferred embodiments respectively of a sensor selection means.

There are a number of more sophisticated arrangements for the sensor selection means. In most cases, these implementations are most easily implemented in the software of the thermostat's microcontroller as mentioned above. In FIG. 2, a countdown timer 44 and a zero test element are formed by software in the microcontroller of thermostat 10. Timer 44 receives an ON time value in the signal on path 30a provided by the occupant. Timer 44 counts down the value of its contents at a predetermined rate. These microcontrollers include a clock or oscillator which can be used to control the decrement rate of the timer 44 contents. The value held in timer 44 is encoded in a signal provided to the zero test element 45. When this value is different from zero, a signal is provided on path 26 causing the microcontroller to select temperature S2 for use in the temperature control algorithm executed by the microcontroller, and which functions as the temperature control circuit 31. When the value provided by timer 44 is zero, the temperature provided to the algorithm is the S1 value encoded on path 22. It is also possible to implement this variant with a mechanical timer element which functions as selector 28 to control the position of switch 25. For example, while the timer is returning to its unwound position, switch 25 is held in the position shown in FIG. 1 with switch terminal 33 connected to input terminal 24. When the timer functioning as selector 28 reaches its unwound position, this causes switch 25 to toggle to the position where terminal 34 is connected to control terminal 24.

FIG. 3 shows another embodiment of this invention, where the temperature of either area 13 or 14 is used as the temperature feedback value to the control algorithm which simulates circuit 31, depending on time of day. It is strongly preferred to implement this embodiment in the software of the microcontroller. In this embodiment, a clock 47 provides a time of day signal generally available within the microcontroller. The ON and OFF time values are provided on path 30a to a memory 49, which may be part of the RAM in the microcontroller. Each time value is designated in some way by the input from the occupant as specifying that one or the other of sensors 17 and 18 should become active at that time. Memory 49 records these ON and OFF times and the identity of the sensor to be activated with each, and provides a signal encoding these time and sensor identity values. The microcontroller periodically executes instructions which configure it as a comparison circuit 46 receiving the time values from memory 49 and clock 47 and the sensor selection identification assigned to each time of day value in memory 49. When the time of day value is detected to cross one of the times in memory 49, then the control signal carried on path 26a indicates that the sensor identified by memory 49 on path 26b is to provide the sensor signal used by the microcontroller when executing instructions which configure it as control element 31.

Figure 4:
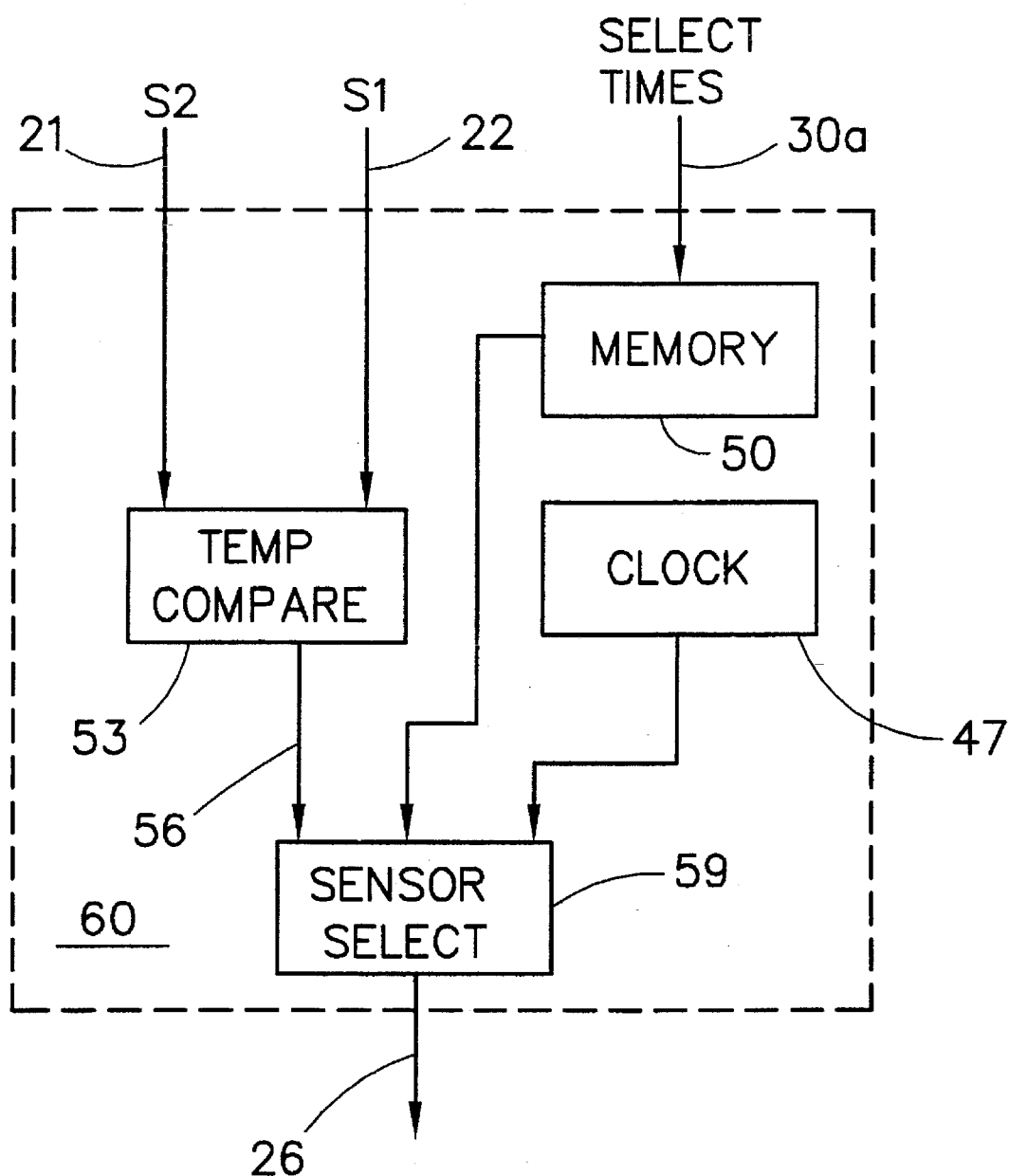
Figure 5:
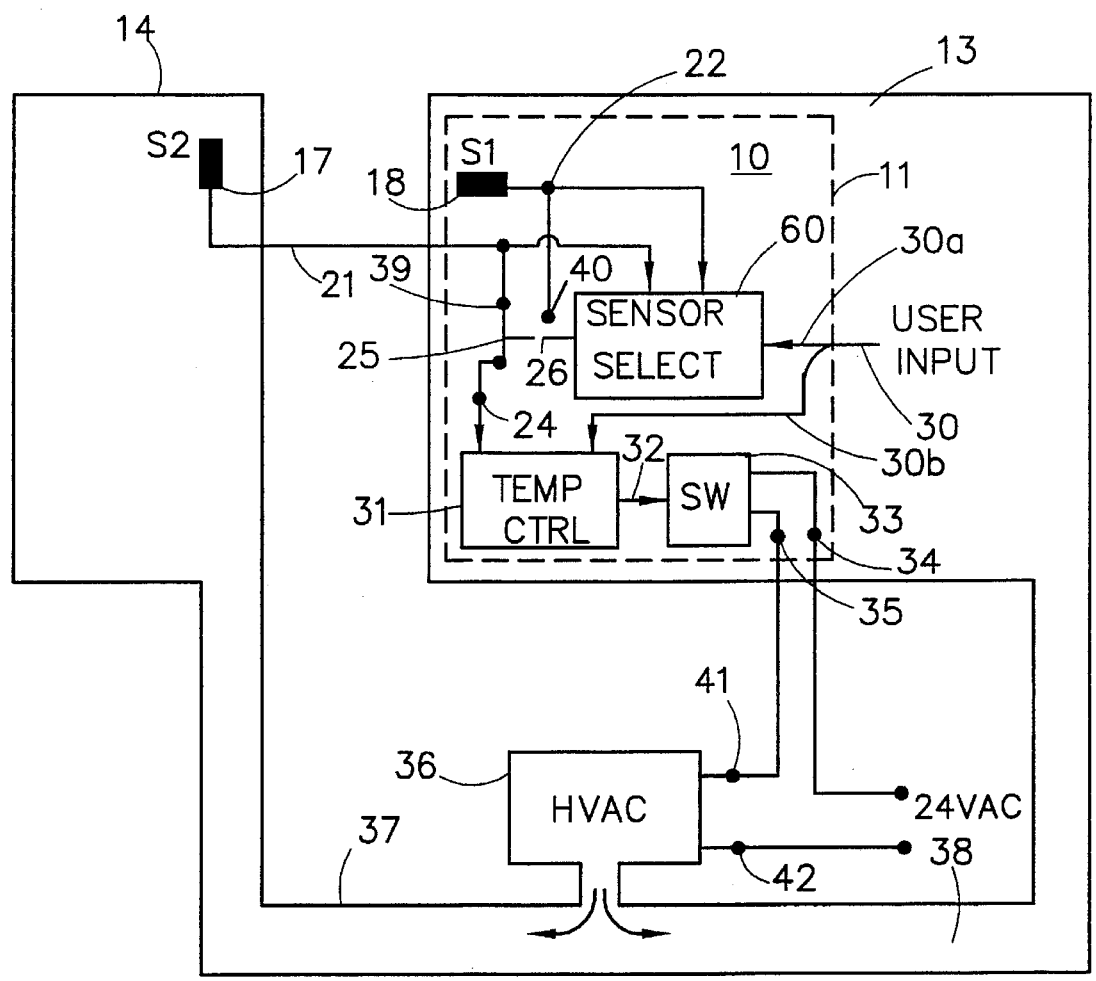
FIG. 5 discloses a system similar to that of FIG. 1 and incorporating the features of FIG. 4.

FIGS. 4 and 5 disclose a more complex type of control, where the measured temperatures in the controlled spaces are used in the algorithm which determines the sensor to be used at any given time. Use of these temperatures is symbolized by the extensions of paths 21 and 22 to sensor select element 60 in FIGS. 4 and 5. There are a number of possible variations. For example, assume that the temperature of the area 13 in FIG. 1 is to be primarily controlled, so S1 becomes the primary feedback temperature. Suppose that at times area 13 is subjected to a temporary high extraneous heat input. For example, area 13 may have a fireplace which is frequently used in the winter evenings. This additional heat input will cause the temperature sensed by sensor 18 to appear to control circuit 31 as at (or above) the set point level, with the result that area 14, which might be a child's bedroom, will cool excessively. At such times, temperature S2 from sensor 17 will be manually (or automatically using the timing inputs to memory 50 and from clock 47) selected to provide the feedback temperature. However, when the fireplace finally wanes as the night grows late, then it is appropriate to again make sensor 18 active to control the temperature of area 13. Temperature compare element 53 receives both temperatures S1 and S2 from the areas 13 and 14, and when temperature S1 fails below the temperature S2, then a signal is provided on path 56 indicating this condition. The sensor compare element 59 receives the signal on path 56 and sets the selection signal on connection 26 to set switch 25 to transmit the S1 temperature signal to sensor signal input terminal 24.

Another approach may be to select the active temperature sensor 17 or 18 on the basis of which is showing a lower or higher temperature. Other approaches may combine temperature level comparison with time-based control. Lastly, the use of only two sensors 17 and 18 is purely arbitrary. It is possible that many installations using this invention might find three or more sensors appropriate.

The preceding has described a number of different embodiments of my invention.

The following claims define the scope of my patent right:

1. In a thermostat having: a switch having a control terminal and a pair of power terminals, and electrically making a connection between the power terminals responsive to presence of a demand signal at the control terminal; and a control circuit having a sensor signal input terminal and an output terminal providing the demand signal to the switch's control terminal responsive to presence of a signal level within a selectable range at the sensor signal input terminal, an improvement comprising:
    a) at least first and second temperature sensors each providing a sensor signal representative of the temperature ambient thereto;
    b) a sensor selection means receiving i) each sensor signal, and ii) a control input signal having at least two values, each of said values designating a different sensor signal, for providing the one of said sensor signals designated by the control input signal to the sensor signal input terminal of the control circuit; and
    c) a countdown timer having an input element providing a time interval value, said timer recording the time interval value, altering the time interval value at a preselected rate, and changing the control input signal provided to the control circuit responsive to the contents of the countdown timer reaching a predetermined value.

2. In combination with the thermostat of claim 1, an enclosure having at least first and second areas, and having the first temperature sensor in the first area and the second temperature sensor in the second area.

3. The combination of claim 2, wherein the control circuit is in the first area.

4. A thermostat for controlling the temperature in an enclosure having at least two separate areas, each area receiving air directly from a HVAC unit, said thermostat including a switch having a control terminal and a pair of power terminals, and electrically making a connection between the power terminals responsive to presence of a demand signal at the control terminal; and a control circuit having a sensor signal input terminal and an output terminal providing the demand signal to the switch's control terminal responsive to presence of a signal level within a selectable range at the sensor signal input terminal, an improvement comprising:
    a) at least first and second temperature sensors each physically located within a different one of the separate areas of the enclosure, and each providing a sensor signal representative of the temperature ambient thereto; and
    b) a sensor selection means receiving i) each sensor signal, and ii) an externally provided control input signal having at least two values, each designating a different sensor signal, for providing the one of said sensor signals provided by the temperature sensor designated by the control input signal to the sensor signal input terminal of the control circuit.

5. The combination of claim 4, wherein the control circuit is in the first area.

6. The thermostat of claim 4, wherein the sensor selection means comprises a manual selection switch, and wherein the control input comprises a manually adjustable element having a position corresponding to each of the sensor signals received by the sensor selection means, wherein each of the manual adjustment element positions sets the switch to conduct the corresponding sensor signal to the sensor signal input terminal of the control circuit.

7. The thermostat of claim 4, wherein the sensor selection means comprises
    a) a clock providing a time of day signal encoding the current time of day;
    b) a memory receiving a time selection signal encoding a time of day value, recording a received time of day value, and providing a memory signal encoding a recorded time of day value;
    c) manual controllable input means for providing the time selection signal to the memory; and
    d) comparator means receiving the time of day signal and the memory signal for changing the sensor signal provided to the control terminal responsive to equality in the time of day values encoded in the time of day signal and the memory signal.

8. The thermostat of claim 7, wherein the sensor selection means receives at least two sensor signals, and comprises means for selecting one of the sensor signals as a function of the relative magnitudes of the temperature values encoded in the sensor signals, and for gating the selected one of the sensor signals to the control terminal of the control circuit.

9. The thermostat of claim 8, wherein the sensor selection means receives at least two sensor signals, and comprises means for selecting the sensor signal encoding the lower of the temperature values encoded in the sensor signals.

10. The thermostat of claim 4, wherein the sensor selection means receives at least two sensor signals, and comprises means for selecting one of the sensor signals as a function of the relative magnitudes of the temperature values encoded in the sensor signals, and for gating the selected one of the sensor signals to the control terminal of the control circuit.

11. The thermostat of claim 10, wherein the sensor selection means receives at least two sensor signals, and comprises means for selecting the sensor signal encoding the lower of the temperature values encoded in the sensor signals.

* * * * *